United States Patent [19]

Iguchi et al.

[11] Patent Number: 4,514,348

[45] Date of Patent: Apr. 30, 1985

[54] METHOD AND APPARATUS FOR ADJUSTING DIE CLEARANCE

[75] Inventors: Katsuhiko Iguchi, Susono; Hidemi Wada, Namazu; Ryuichi Wakita, Mishima, all of Japan

[73] Assignee: Toshiba Kikai Kabushiki Kaisha, Tokyo, Japan

[21] Appl. No.: 418,836

[22] Filed: Sep. 16, 1982

[30] Foreign Application Priority Data

Nov. 15, 1981 [JP] Japan ................................. 56-177443

[51] Int. Cl.³ ................................................ B29F 3/04
[52] U.S. Cl. ................................ 264/40.1; 264/40.2; 264/40.5; 425/141; 425/171; 425/172; 425/466
[58] Field of Search .................... 264/40.1, 40.2, 40.5; 425/140, 141, 171, 172, 466

[56] References Cited

U.S. PATENT DOCUMENTS

| | | | |
|---|---|---|---|
| 3,122,784 | 3/1964 | Jolliffe | 425/141 |
| 3,341,388 | 9/1967 | Bunyea | 425/141 |
| 3,599,288 | 8/1971 | Eakman | 264/40.5 |
| 3,761,553 | 9/1973 | Richardson | 425/141 |
| 3,775,035 | 11/1973 | Scotto et al. | 264/40.5 |
| 3,819,775 | 6/1974 | Mules | 425/141 |
| 3,883,279 | 5/1975 | Heyer | 425/141 |
| 3,920,365 | 11/1975 | Mules | 425/141 |
| 3,940,221 | 2/1976 | Nissel | 425/466 |
| 3,985,845 | 10/1976 | Akatsuka et al. | 264/40.5 |
| 4,124,342 | 11/1978 | Akatsuka et al. | 425/141 |
| 4,125,350 | 11/1978 | Brown | 425/141 |
| 4,252,519 | 2/1981 | Farmer et al. | 425/141 |
| 4,281,980 | 8/1981 | Hoagland et al. | 264/40.1 |
| 4,409,160 | 10/1983 | Kogo et al. | 264/40.1 |

*Primary Examiner*—Jeffery Thurlow
*Attorney, Agent, or Firm*—Cushman, Darby & Cushman

[57] ABSTRACT

An apparatus for adjusting die clearance for an extruder producing a sheet in a die having an adjusting device for adjusting the die clearance between an upper die and a lower die, a measuring device for measuring thicknesses of the sheet at a plurality of positions in the direction of width on the sheet, a setting device for setting desirable thicknesses at the positions, an adjusting data producing device for producing data with respect to die displacement to be adjusted from the measured data and the desirable thicknesses, and control device for controlling the adjusting device in order that the die clearance coincides with the desirable thickness. Rough adjustment can be effected by tightening or loosening the bolts while fine adjustment is achieved by heating the bolts with an electrical heater disposed thereabout.

11 Claims, 10 Drawing Figures

METHOD AND APPARATUS FOR ADJUSTING DIE CLEARANCE

BACKGROUND OF THE INVENTION

This invention relates to a method and apparatus for adjusting die clearance for an extruder producing a sheet, film or coating on a magnetic record of a thermoplastic resin, cellulose, rubber and the like, paper, cellophane hopper or printing ink and the like.

In a die device for molding a sheet or film of this kind (hereinafter referred to as the "sheet"), as shown in FIGS. 1 and 2, the size of die clearance 11 is adjusted by pushing or pulling a plurality of bolts 12 disposed in the direction of width in order to change the pushing force acting upon a backface 15 of an upper die element 13 and to thereby adjust the degree of bending at a neck portion 14 of upper die element 13.

However, upper die element 13 is a continuous body and when a specified bolt is manipulated, the die clearance changes not only at the position where that specified bolt acts but also at the other portions. This phenomenon is referred to as the "mutual interference effect". Ideally, the effects should be additive according to the "principle of superposition". Unfortunately, they are not. Thus, as shown in FIG. 3, the lip deviation when only the eighth bolt of twenty-two adjusting bolts is manipulated (curve a) or when only the fifteenth (curve b) is manipulated cannot be added to determine the deviation when both eighth and fifteenth (curve c) are manipulated. Thus, at the position of the 8th bolt curve a is 30, curve b is 10 and curve c is 35, not 40.

The adjustment of die clearance has been mostly carried out empirically through manual work of an operator. Therefore, some difference for adjusting occurs from operator to operator, resulting in low accuracy of die clearance, time-consuming adjustment and danger in adjustment.

SUMMARY OF THE INVENTION

Accordingly, the present invention is directed to a method and apparatus for automatically adjusting the die clearance which eliminates the problems mentioned above. More specifically, the present invention is directed to a method and apparatus for adjusting the die clearance, which measures the thickness of the sheet in the direction of width during molding, detects whether or not the measured sheet thickness attains a predetermined thickness and, when not, automatically operates the adjusting bolts for adjusting the die clearance while considering the abovementioned "mutual interference effect" so as to adjust the die clearance to the predetermined sheet thickness. Rough adjustment can be effected by tightening or loosening the bolts while fine adjustment is achieved by heating the bolts with an electrical heater disposed thereabout.

DESCRIPTION OF THE PREFERRED EMBODIMENT

Figure 4:
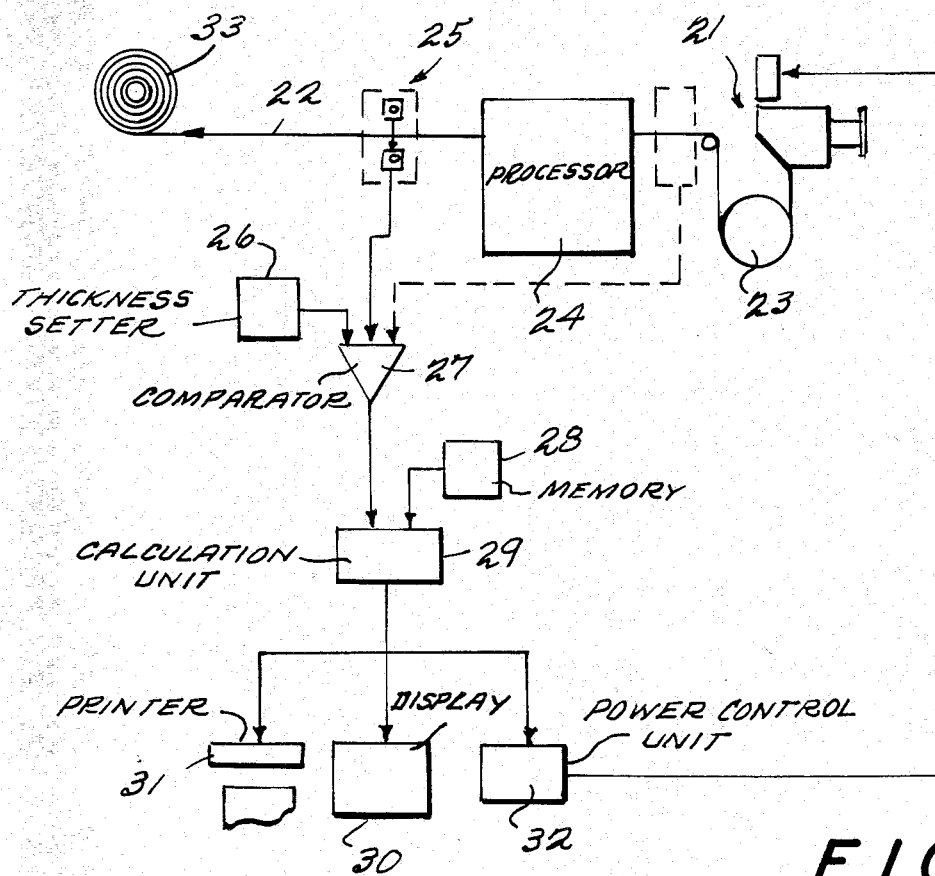
FIG. 4 illustrates a block diagram showing an embodiment of the present invention.
Figure 3:
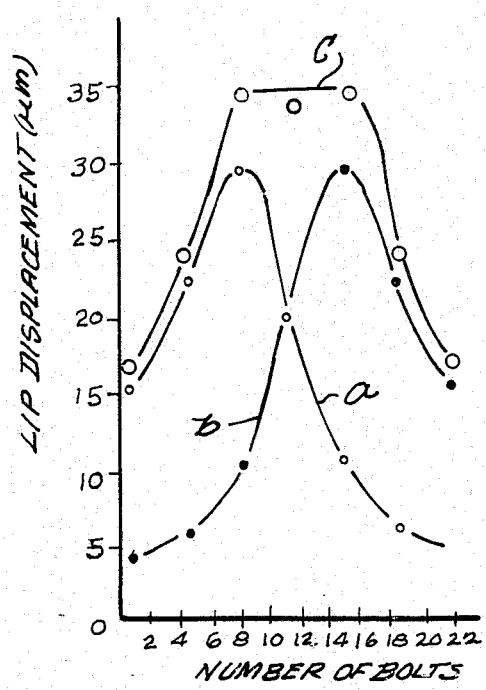
FIG. 3 illustrates a diagram showing the relation between adjusting bolts and lip displacement.
Figure 5:
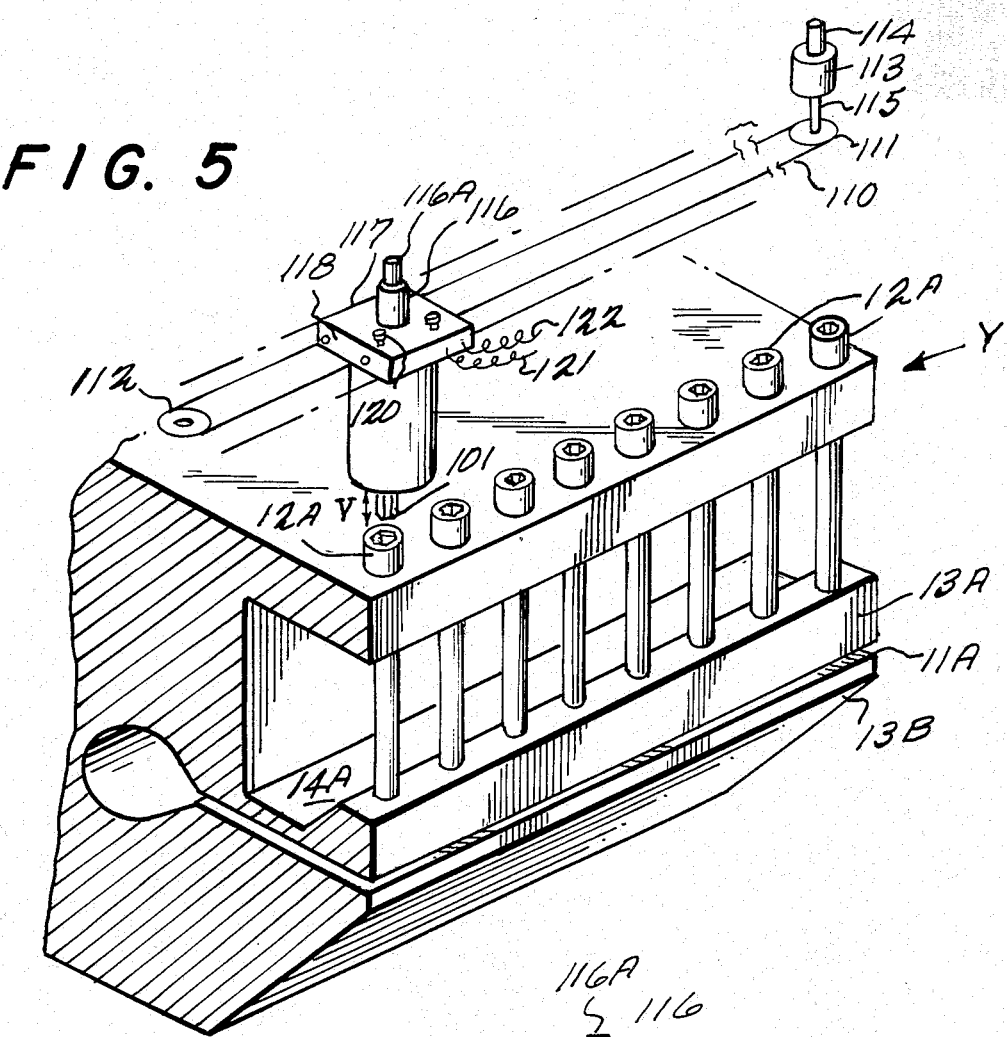
FIG. 5 illustrates a perspective view showing a die device and automatic rotating device of the embodiment of FIG. 4.
Figure 6:
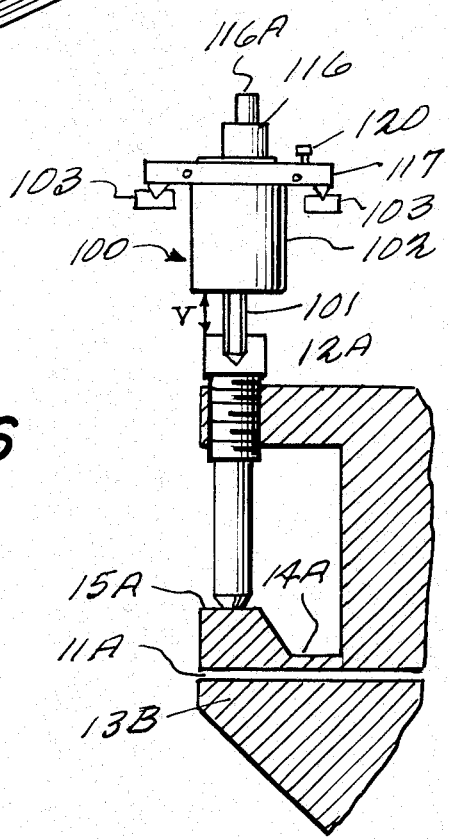
FIG. 6 illustrates a side view as viewed from an arrow Y in FIG. 5.

An embodiment of the present invention will be explained with reference to FIGS. 4, 5 and 6. In FIG. 4, a die device 21 is mounted on an extruder (not shown) and has a lip portion 11A which is formed between an upper die element 13A and a lower die element 13B as shown in FIGS. 5 and 6.

The degree of opening at the lip portion, which forms the aforementioned die clearance, may be adjusted by adjusting bolts 12A each of which is rotated by a tool 101 rotatably mounted on an automatic rotating device 100. Device 100 is arranged so as to be movable along the direction in which adjusting bolts 12A extend and to stop at each adjusting bolt 12A. For this purpose, automatic rotating device 100 is slidably mounted on a guide rail 103.

A wire 110 between pulleys 111 and 112 extends through holes 118 and 119 of a plate 117 which supports member 102. Member 102 has a mechanism for transmitting rotation of motor 116 and effecting movement in the vertical direction. The wire is also attached to supporting plate 117 by a screw 120.

Therefore, automatic rotating device 100 may be moved in the direction along which adjusting bolts 12A extend by rotating pulley 111 connected to a shaft 115 of a motor 113. A rotary encoder 114 produces a signal representing the position of automatically rotating device 100.

Figure 1:
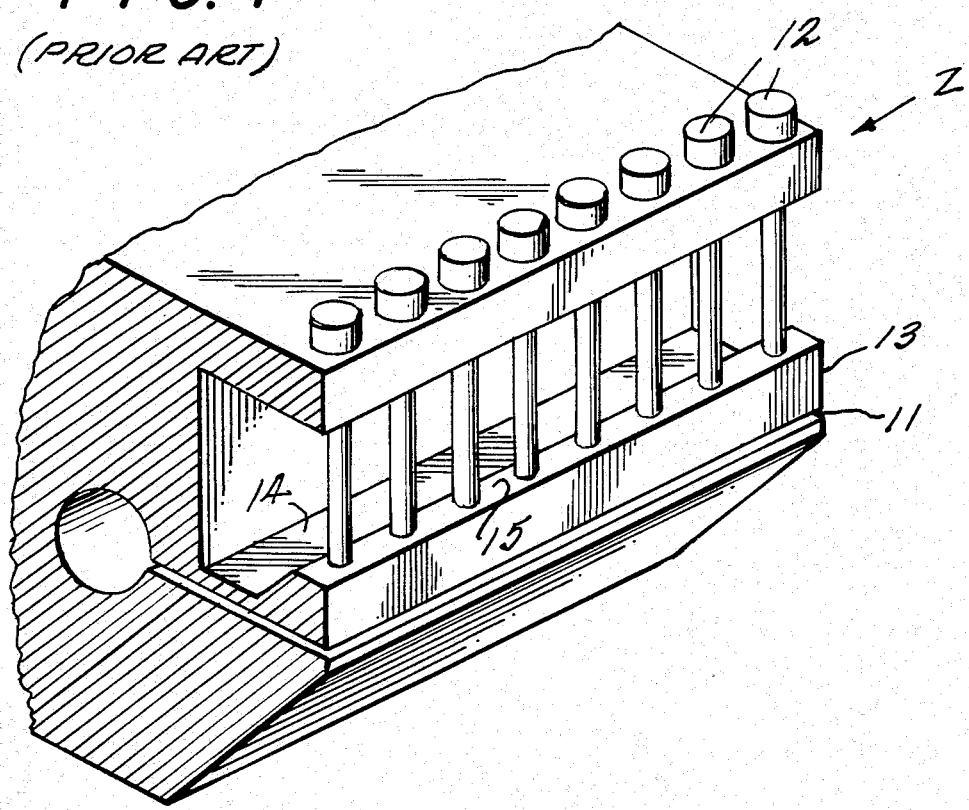
FIG. 1 illustrates a perspective view showing a conventional die of the prior art.
Figure 2:
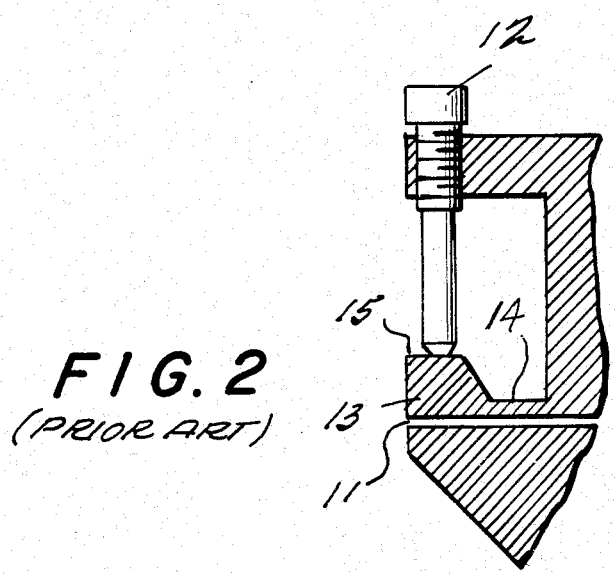
FIG. 2 illustrates a side view as viewed from an arrow Z in FIG. 1.

Through lead wires 121 and 122 connected to supporting plate 117 from a power control unit 32 shown in FIG. 4 are applied control signals and electric power, respectively. The control signals control the rotation, which is measured by a resolver 116A, of a servo motor 116 which rotates tool 101. The control signals still further control the position of tool 101 in the vertical direction. Tool 101 descends to a vertical position at which tool 101 fits into the hollow of the head portion of bolt 12A. Rotating device 100 is stopped at each adjusting bolt. Each numeral 11A, 12A, 13A, 14A and 15A designate elements corresponding to the elements of numerals 11, 12, 13, 14 and 15 shown in FIGS. 1 and 2.

Referring to FIG. 4, a sheet 22 extruded out from lip portion 11A travels around a cooling roller 23 and a conventional treating processer 24 to a winder 33 where it is taken up by the winder. The thickness of sheet 22, after it is treated by processer 24, which may stretch sheet 22, is continuously measured by a measuring device 25 for example, using B-rays. The sheet thicknesses measured by device 25 are compared by comparator 27 with the desirable values set by a manually operable thickness setter 26 for setting the sheet thicknesses at a plurality of predetermined positions in the direction of width of die device 21. Thus, comparator 27 determines the die clearance to be varied in accordance with the difference values between setting thickness and measured thickness at each position mentioned above. The die clearances to be varied as derived from comparator 27 are fed to a calculation unit 29 to which also data from a memory device 28 are fed.

The data stored in memory device 28 represent a group of coefficients relating displacement quantities and loads on each adjusting bolt 12A at each position mentioned above. Calculation unit 29 therefore calculates displacement quantities for each adjusting bolt 12A.

A display device 30 such as a cathode ray tube displays the displacement quantities calculated by calculation unit 29. Print-out is also possible if the output of calculation unit is fed to a printer 31. A power control unit 32 supplies signals to servo motor 116 to cause rotation until the measured displacements of bolts 12A reach those calculated by calculation unit 29.

Figure 7:
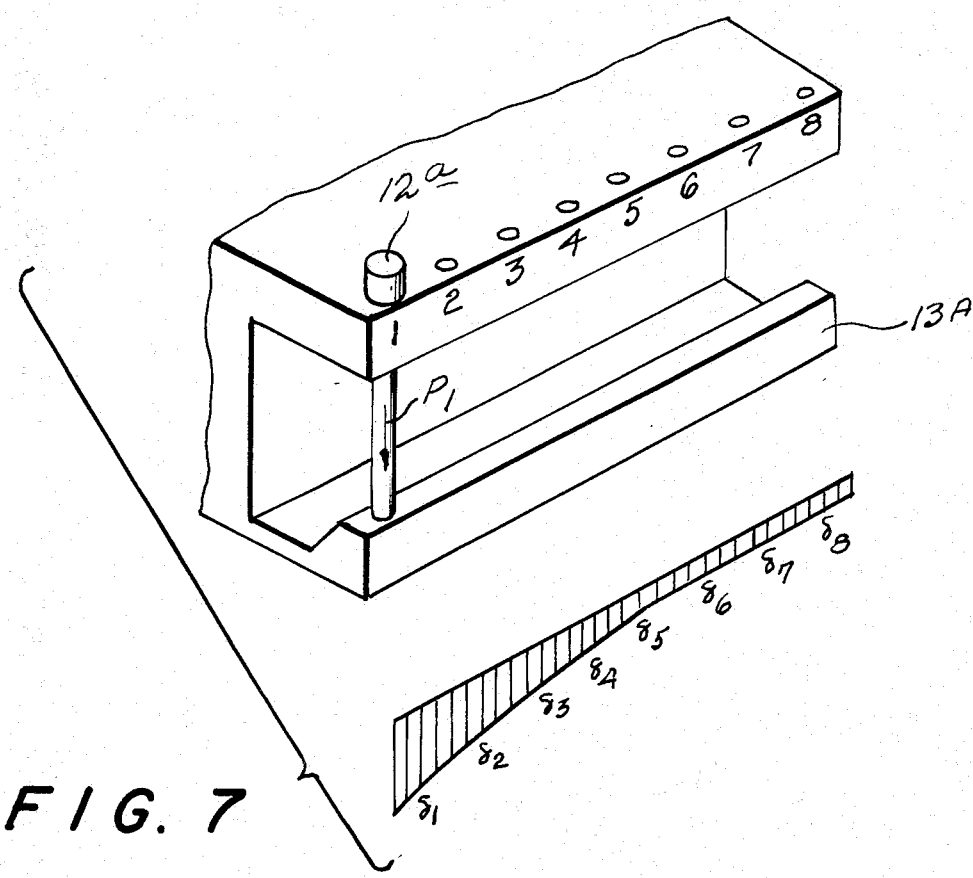
FIG. 7 illustrates a diagram showing how the deformation of the die as a whole is effected by adjusting one bolt.

Having the above-described construction, the apparatus of the present invention operates in the following manner. It will now be assumed that in FIG. 7, when a bolt load $P_1$ is applied only to the first bolt 12$a$ of eight adjusting bolts, the deformation of the die exhibits a displacement quantity $\delta_1, \delta_2, \ldots \delta_8$ at each of the predetermined positions. Thus, $$\delta_I = f_{I,1} P_1 \tag{1}$$

where $f_{I,1}$ is a coefficient of the die clearance at the first position with respect to the load onto first bolt 12$a$.

Generally, the displacement quantity $\delta_I$ is given by:

$$\delta_I = f_{I,J} P_J (J = 1, 2, 3, \ldots n) \tag{2}$$

The constant $f_{I,J}$ represents a matrix of coefficients inherent to each die device and can be obtained theoretically or experimentally. The matrix of coefficients are stored in advance in memory 28.

The desirable sheet thickness $E_I$ at each of the plural predetermined positions is set into setter 26. Comparator 27 compares this set value with the measured value ($EM_I$) given from measuring device 25 and calculates the displacement quantity $\delta B_I$ of the die clearance to be varied by each adjusting bolt from the difference between the set value and the measured value, as $e_I (I = 1, 2, \ldots n)$. If the displacement quantity of each load onto the bolt required for obtaining each $e_I$ is expressed as $\Delta P_J (J = 1, 2, \ldots n)$, the relationship between $\Delta P_J$ and $e_I$ is given as follows by using the coefficient $f_{I,J}$ stored in memory device 28.

$$e_I = \sum_{J=1}^{n} f_{I,J} \cdot \Delta P_J (I = 1, 2, 3, \ldots n) \tag{3}$$

Namely, $e_1 = f_{1,1}\Delta P_1 + f_{1,2}\Delta P_2 + f_{1,3}\Delta P_3 + \ldots + f_{1,n}\Delta P_n$ $e_2 = f_{2,1}\Delta P_1 + f_{2,2}\Delta P_2 + f_{2,3}\Delta P_3 + \ldots + f_{2,n}\Delta P_n$ $e_3 = f_{3,1}\Delta P_1 + f_{3,2}\Delta P_2 + f_{3,3}\Delta P_3 + \ldots + f_{3,n}\Delta P_n$ In other words, multiple simultaneous linear equations are solved for $\Delta P_J$ by GAUSE-SEIDEL method or asymptotic method, for example. The displacement quantity for each bolt, $\delta BI$, is given by the following Equation (4) in consideration of the bolt's deformation by compressing.

$$\delta BI = e_I + \frac{\Delta P_I}{k} (I = 1, 2, 3, \ldots n) \tag{4}$$

where k is a spring constant of the bolt.

The bolt displacement quantity $\delta_{BI}$ is determined in the abovementioned manner and it is applied from the calculation unit 29 to display 30 using the CRT or to printer 31. It is also applied to power control unit 32 to achieve the predetermined die clearance. In this manner, the drawbacks first herein described can be eliminated.

In addition in FIG. 4, it may also be possible that measuring device 25 is located just after cooling roller 23 as shown with broken lines.

Figure 8:
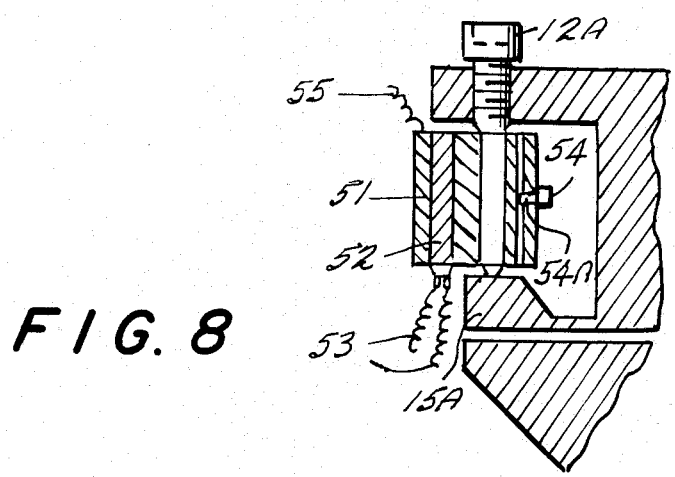
FIG. 8 illustrates another embodiment for adjusting die clearance.

Furthermore, FIG. 8 shows another way to provide fine displacement in the direction of die clearance to upper lip 15A by heating adjusting bolt 12A. In FIG. 8, holder 51 mounting bolt 12A provides an elongated heating unit 52 parallel with bolt 12A, so that bolt 12A can be heated through holder 51 by heating unit 52. Electric current is applied through a wire 53, which is connected to power control unit 32 as shown in FIG. 4. Holder 51 is also provided with an inlet 54 and an out flow passage 54A for cooling fluid, for example, air at low temperature. This permits quick response to the desired thermal displacement of bolt 12A. Holder 51 is also provided with a thermo-couple 55 for measuring the temperature of the portion adjacent bolt 12A. In this embodiment, calculation unit 29 calculates a desirable temperature $\theta_I$ for each bolt, which corresponds to the displacement quantity $\delta BI$ mentioned above.

Figure 9:
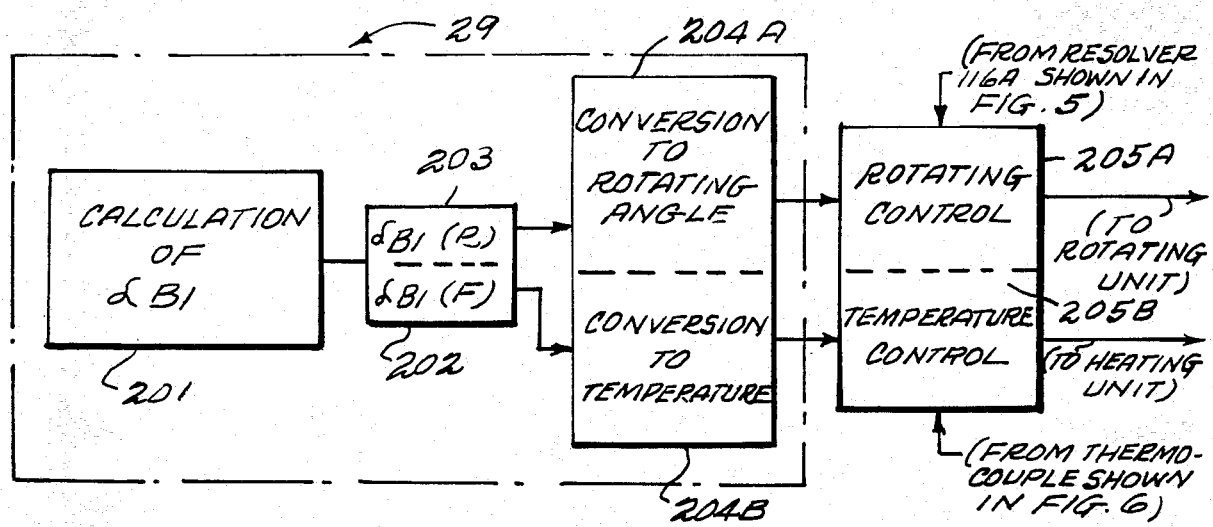
FIG. 9 illustrates a detailed block diagram of a calculation unit.

FIG. 9 illustrates a block diagram for explaining the details of calculation unit 29 and power control unit 32 shown in FIG. 4. More specifically, FIG. 9 illustrates a combination for rotating and heating bolt 12A shown in FIG. 5 and FIG. 8, respectively.

In FIG. 9, calculation unit 29 has a calculation portion 201 which calculates the displacement quantity $\delta BI$ at each position of bolt 12, a setting portion 202 on which is set a value "m" corresponding to the value of minimum resolution of servomotor 116 shown in FIG. 5, and a dividing portion 203 which divides the displacement quantity $\delta BI$ into the rough value "$\delta BI (R)$" and the fine value "$\delta BI (F)$", as shown in the FIGURE, where R stands for rough and F for fine. The integer N is selected according to the following expressions.

$\delta BI (R) = N \cdot m$ $\delta BI (F) = \delta BI - \delta BI (R) < m$

Calculation unit 29 also includes rotating angle conversion portion 204A and temperature conversion portion 204B. Portion 204A converts the value "N·m" to a rotation angle for servo motor 116 and portion 204B converts the value "$\delta BI (F)$" to a temperature value corresponding thereto. Power control unit 32 has rotating control portion 205A and temperature control portion 205B, to which are applied feedback signals from resolver 116A and thermo couple 55, respectively.

Figure 10:
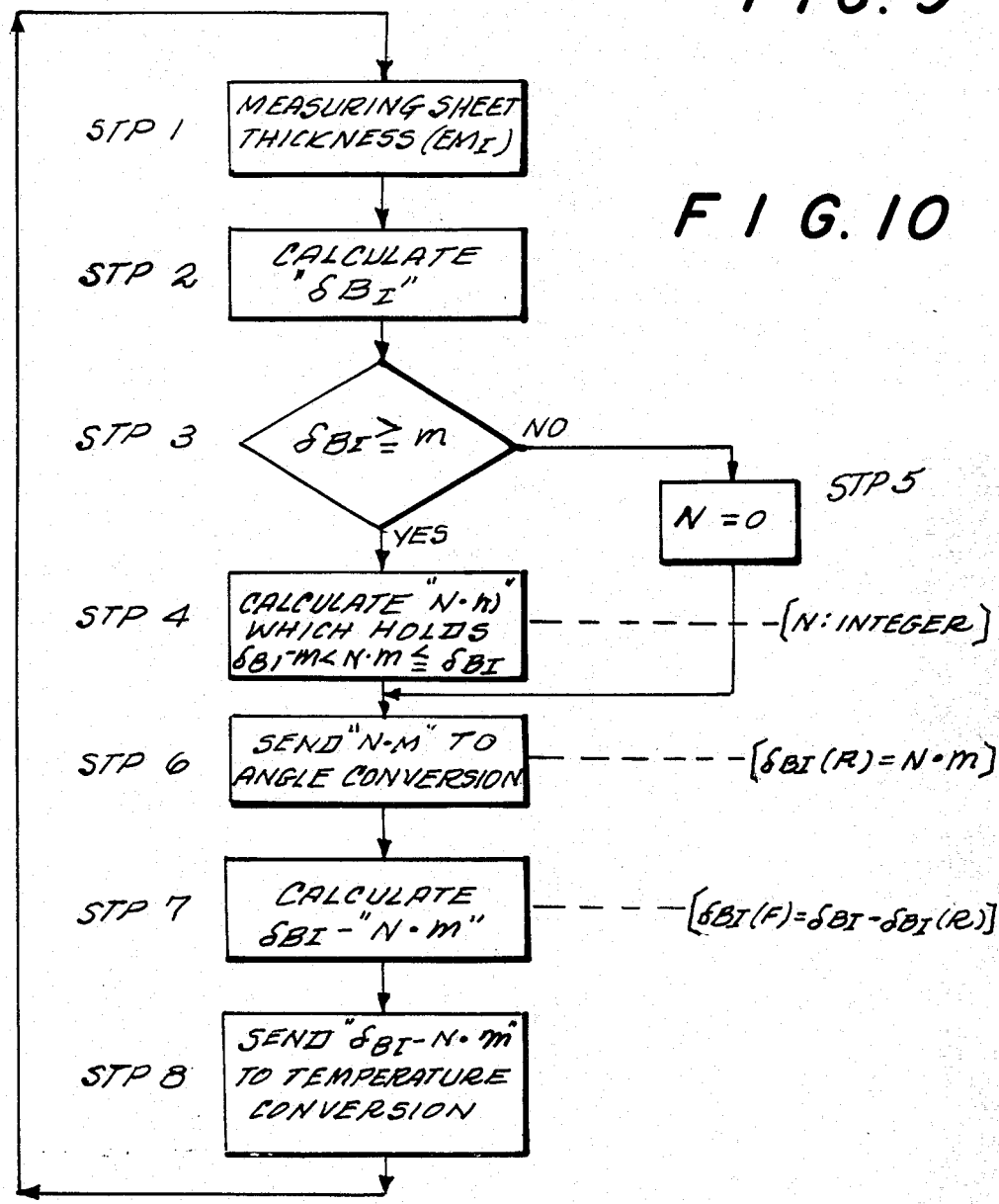
FIG. 10 illustrates a flow chart for explaining the operation of the calculation unit.

FIG. 10 illustrates the flow chart showing the process of execution in calculation unit 29. In FIG. 10, step 1 of the process shows the measuring of sheet thickness $EM_I$ at the each measuring position. Step 2 shows the calculating of displacement quantity δBI. At step 3, it is checked whether the value "δBI" is larger than or equal to "m" or not.

When "δBI" is larger than or equal to "m" at step 3, the value N·m is calculated at step 4 where "N" is an integer and the following expression results:

$$\delta BI - m < N \cdot m \leq \delta BI$$

When "δBI" is smaller than "m" at step 3, the value of "N" is set as zero at step 5.

At step 6, the calculated value "N·m" is converted to the rotating angle of servo motor 116.

At step 7, the remaining value "δBI (F)" (which equals to "δBI−N·m") determined, and at step 8, the value "δBI (F)" is converted to the value of the temperature of bolt 12A for producing thermal displacement of the bolt. By using the combination of rotating and heating the bolt as shown in FIG. 9 and FIG. 10, it is possible to minimize the electric power supply requirements for heating the bolt. Furthermore, it is possible to constitute a quick response system for reducing the difference $e_I$ between the desirable value $E_I$ and measured value $EM_I$ at each position.

It is to be understood that the invention is not limited in its application to the details of construction and arrangement of parts illustrated in the accompanying drawings since the invention is capable of other embodiments and of being practiced or carried our in various ways.

What is claimed is:

1. An apparatus for adjusting die clearance between an upper die and a lower die of an extruder for producing a sheet with a plurality of adjusting bolts extending between said upper and lower dies at separated locations across the width of said sheet for adjusting the clearance comprising:
   means for measuring the thickness of said sheet at said separated locations after said sheet has emerged from said extruder and producing a signal for each location indicating the measured thickness;
   means for calculating for each bolt from the signal of the associated location a desired bolt displacement δB and producing a rough bolt displacement δB(R) and a fine bolt displacement of δB(F) such that $\delta B = \delta B(R) + \delta B(F)$;
   means mounted adjacent said bolts for receiving said rough bolt displacement signals δB(R) and mechanically tightening or loosening each bolt in accordance with the associated δB(R) signal; and
   means adjacent each said bolt for receiving said fine bolt displacement signal δB(F) associated with the adjacent bolt and heating the adjacent bolt in accordance with the received signal δB(F).

2. An apparatus as in claim 1, further including means for setting for each bolt a desirable thickness.

3. An apparatus for adjusting die clearance for an extruder producing a sheet as in claim 2, wherein said calculating and producing means includes a comparator which produces a signal for each bolt indicating the difference between said measured thickness and said desirable thickness, a memory which stores data consisting of coefficients defining the relationships between displacement quantities of said dies and forces acting on said dies and means for calculating data with respect to displacement quantities of said dies to be adjusted.

4. An apparatus for adjusting die clearance for an extruder producing a sheet as in claim 1, wherein said control means includes a printer for printing out said data from said producing means.

5. An apparatus for adjusting die clearance for an extruder producing a sheet as in claim 1, wherein said control means includes a display unit for displaying said data from said producing means.

6. Apparatus for adjusting die clearance between an upper die element and a lower die element for an extruder producing a sheet comprising:
   means for adjusting said die clearance, including a plurality "n" of adjusting members, each acting on a backface of one of said die elements at each of a plurality of separated positions in the direction of width across the sheet, and means for causing said adjusting member to move in the direction of the die clearance to change said die clearance at that position;
   means for measuring the thicknesses of said extruded sheet at each of said plurality of positions in the direction of width across the sheet;
   means for storing desirable thicknesses of the sheet for each position;
   means for comparing the measured thicknesses with the desirable stored thicknesses, and producing a signal indicating the difference ($e_I$) at each position "I" in said direction;
   means for producing a signal indicating the displacement quantities (δBI) for said adjusting member at each position "I"; including:
      a memory for storing the values of spring constant (K) of said adjusting members and storing a plurality of matric data ($f_{I,j}$) defined as coefficient factors of multiple simultaneous linear equations representing the relationships between each compensating incremental force value ($\Delta P_1, \Delta P_2, \Delta P_3, \ldots, \Delta P_n$) acting on each backface at each of said positions and the resultant desired values of displacement of the die element of the position "I" exerted by said each compensating incremental force value ΔP, and
      calculation means for determining each said compensating increment of forces $\Delta P_1$ by simultaneous solving of said equations by using said stored coefficient factors ($f_{I,j}$) and said differences ($e_I$), and determining said displacement quantities of δBI for each adjusting member at each position "I" by adding said values ($e_I$) to $\Delta P_I$; and
   means for applying said signal corresponding to the quantities (δBI) to said causing means so that said measured thickness at said each position coincides with said desirable stored thicknesses.

7. Apparatus as in claim 6, wherein each said adjusting member is a bolt mounted on the die means.

8. Apparatus as in claim 7, wherein said causing means includes a heater for heating said bolt.

9. Apparatus as in claim 7, wherein said causing means includes a mechanical device for rotating the bolt.

10. Apparatus as in claim 7, wherein said causing means includes a mechanical device for rotating the bolt for rough adjustment thereof, and a heater for heating the bolt for fine adjustment.

11. A method for adjusting die clearance between an upper die element and a lower die element for an extruder extruding a sheet of material comprising the steps of:

storing the desirable thicknesses of the sheet at a plurality of positions in the direction of width across the sheet;

measuring the thicknesses of the sheet at each said position;

storing the values of spring constant (k) of said adjusting members and a plurality of matrix data $f_{I,J}$ defined as coefficient factors of simultaneous linear equations representing the relationships between each compensating incremental force value ($\Delta P_1$, $\Delta P_2$, $\Delta P_3$ ... $\Delta P_n$);

comparing the measured thicknesses with the desirable thicknesses, thereby producing a difference signal ($e_J$) by which the die clearance is to be adjusted through an adjusting member located at the position "I";

calculating each increment of forces ($\Delta P_1$, $\Delta P_2$, ... $\Delta P_n$) acting on the backface of the die element by solving multiple simultaneous linear equation formed with said values of the difference ($e_J$), the stored matrix data ($f_{I,J}$) and said each increment of forces;

determining the displacement quantity signal $\delta BI$ for adjusting members to be adjusted at the position "I" on said die element by adding said difference ($e_J$) to a compensation value expressed as $\Delta P_I/K$; and applying said displacement quantity signal to means for applying a force to said adjusting members.

* * * * *